July 29, 1952     M. J. G. TIPPER     2,604,657
CASING APPLIER
Filed Oct. 24, 1949     2 SHEETS—SHEET 1
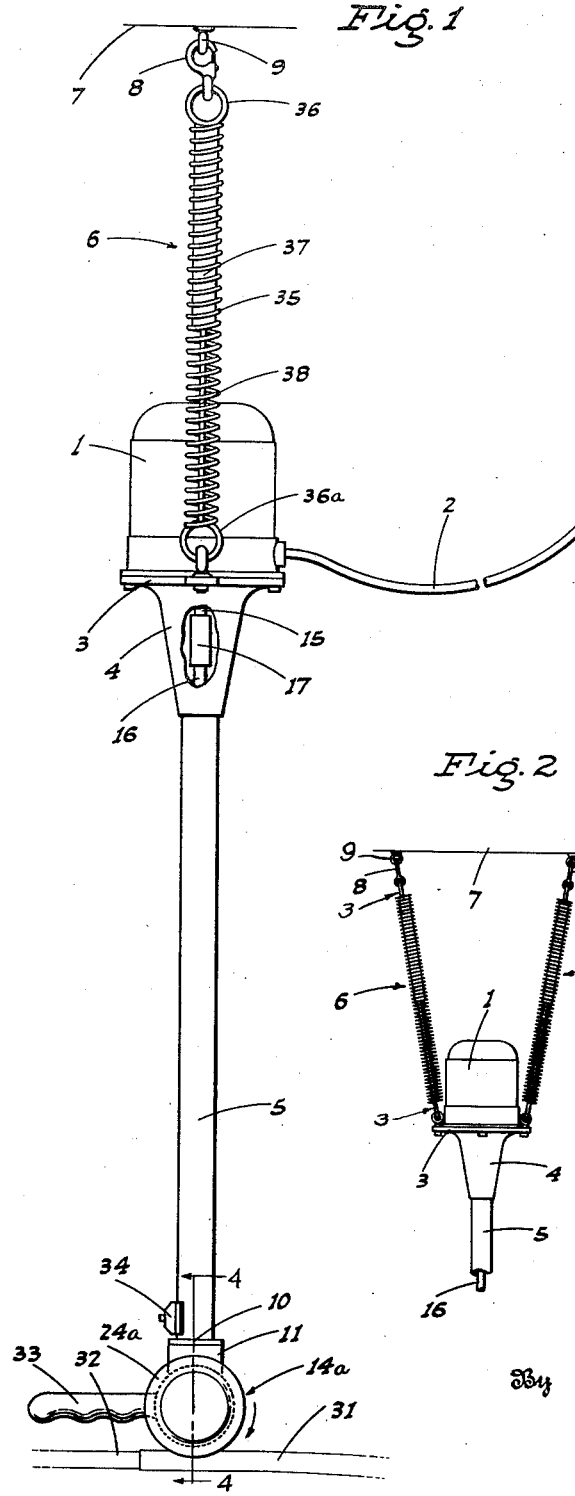
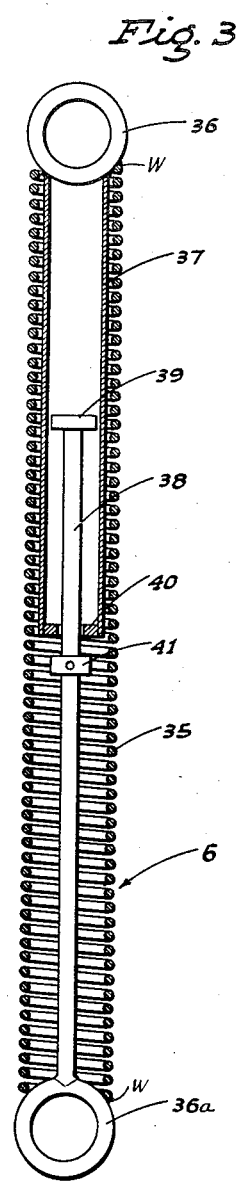
Inventor
Maynard J. G. Tipper
By
ATTORNEYS

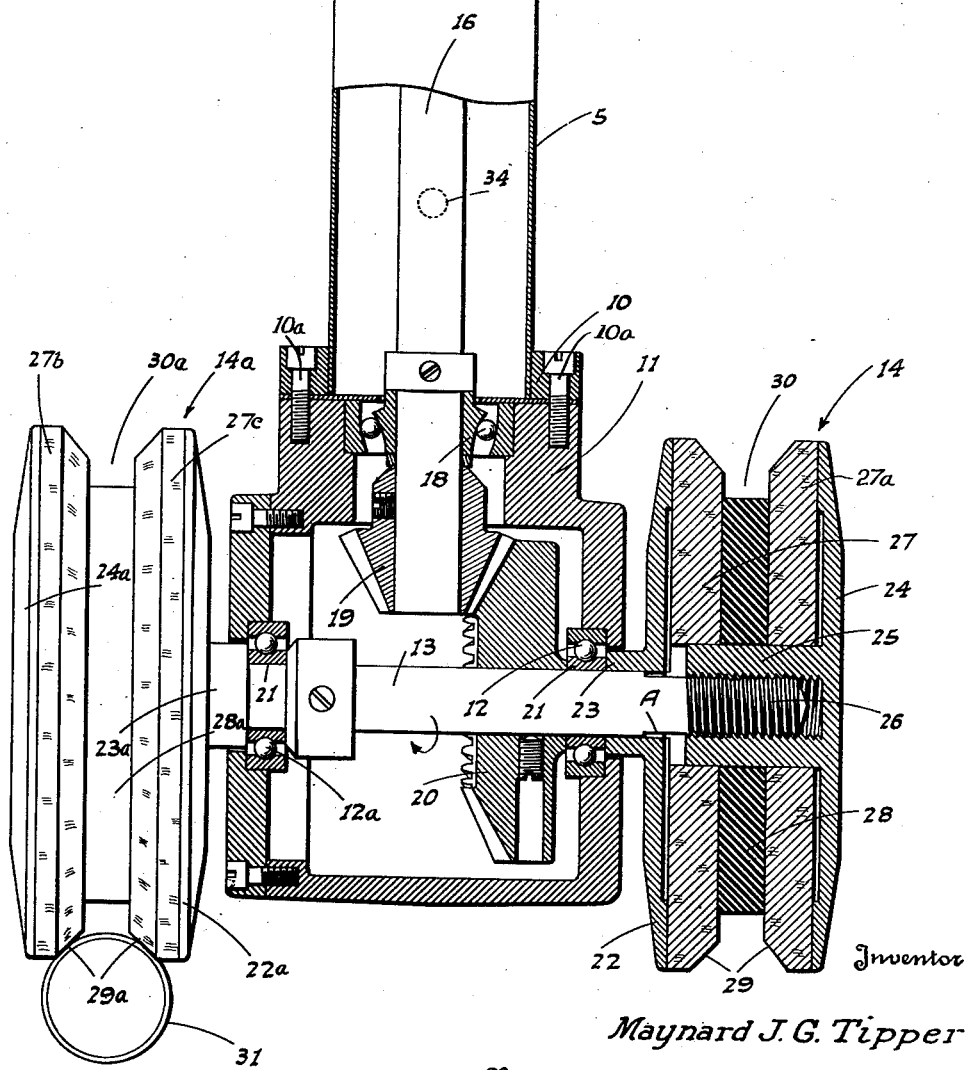

Patented July 29, 1952

2,604,657

UNITED STATES PATENT OFFICE 2,604,657

CASING APPLIER

Maynard J. G. Tipper, Sacramento, Calif.

Application October 24, 1949, Serial No. 123,288

2 Claims. (Cl. 17—42)

This invention relates to a sausage-casing applier such as is used to feed sausage casing onto the horn of a sausage meat extruding machine.

The casing applier includes driven rotary casing-engaging units, a drive motor above the same, and a drive mechanism between the motor and units, and one object of the invention is to provide a mounting means for the motor and units which not only ties them together in rigid relationship, but also completely encloses the mechanism making the applier extremely sanitary as well as safe to use.

Another object of the invention is to provide a casing applier which is a portable, self-contained unit, readily set up for use or demounted without any tools being necessary.

A further object of the invention is to provide spring suspension units for the applier arranged so that while the casing engaging wheels are normally clear of and above the extruding horn, a relatively slight downward pressure by the operator is all that is needed to lower the wheels into operative engagement with the horn.

Also included as a novel feature of each spring suspension unit is a safety device arranged to prevent falling of the applier in the event of spring failure.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Figure 1 is a side elevation of the improved casing applier as in use.

Fig. 2 is a fragmentary elevation of the upper portion of the applier, looking at right angles to Fig. 1, and on a reduced scale.

Figure 3 is an enlarged sectional elevation of one of the spring suspension units, taken on line 3—3 of Fig. 2 and detached.

Figure 4 is an enlarged end elevation, mainly in section of the main lower portion of the device and taken on line 4—4 of Fig. 1.

Referring now more particularly to the characters of reference on the drawings, the casing applier comprises essentially a vertical axis electric motor 1, having a flexible extension cable 2 by which to make connection with a source of current. The motor is secured to the base plate 3 of a depending frusto-conical bell 4 from which a relatively long rigid tubular member 5, concentric with the motor axis, depends. Plate 3 is suspended from opposite sides by a pair of spring suspension units 6 and 6a which will be described in detail later. Units 6 and 6a diverge upwardly to a ceiling beam 7 or the like and from which they are removably supported by suitable means such as snap hooks 8 and 8a on the units 6 and 6a engaging eyes 9 and 9a mounted in and depending from the beam.

Member 5 is provided at its lower end with a base ring 10 secured by machine screws 10a on a gear housing 11 which supports, on ball bearings 12 and 12a mounted in the side walls of the housing, the horizontal shaft 13 of the opposed dual rotary and identical casing engaging wheels 14 and 14a.

The shaft 15 of motor 1 is alined with another shaft 16 depending through member 5 into housing 11, shafts 15 and 16 being connected by a hose-like coupling 17 within bell 4, so that extreme rigidity at the point of connection is avoided.

Within housing 11, shaft 16 is centered by a ball bearing 18, and below the bearing carries a bevel pinion 19 engaging a bevel gear 20 fixed on shaft 13 inwardly of but in contact with the inner race-ring 21 of the adjacent bearing 12.

Wheel 14 comprises an inner backing plate 22 having a hub 24 slidable on the shaft 13 and engaging ring 21 as a back stop. The outer backing plate 23 has a hub 25 screwed onto the outer end threaded portion 26 of the shaft 13. Between plates 22 and 24, and fitting on hub 25, are the casing-engaging discs 27 and 27a of cork or similar relatively soft friction material, and a spacer disc 28, of rubber or other resilient compressible material, between discs 27 and 27a. The adjacent faces of discs 27 are sharply beveled at their periphery as shown at 29; the diameter of spacer disc 28 being less than that of the base of bevels 29. The disc 28 being of resilient material, a clamping action on the discs 27 and 27a as well as on the shaft threads, is obtained.

The bevels 29 provide a V-shaped groove 30, enabling any casing 31, regardless of its diameter, to be engaged in frictional feeding relation; that is on the upper portion of the casing in opposite sides of its central vertical plane.

Only hand pressure is required on outer plate 24 when mounting or demounting discs 27 and 27a; the other wheel 14a, if in place, being then hand-held to prevent rotation of the shaft 13. Wheel 14a, which as stated is identical to wheel 14, similarly includes inner and outer backing plates 22a and 24a, plate 22a having a hub 23a on shaft 13, cork discs 27b and 27c having their adjacent faces beveled as at 29a, and a resilient spacer 28a leaving a V-shaped groove 30a between the bevels 29a.

When mounting the first wheel, the bare shaft at the opposite end is held against rotation by a wrench engaged with exposed flattened areas A on said shaft.

The casing applier is mounted directly above the horn 32 of a sausage extruding machine (not shown) and so that when hanging free, wheels 14 and 14a are a short distance above the horn.

A handle 33 is fixed rigid with and projects back from casing 11 and the spring balance is such that the operator need only press down lightly on the handle to lower either wheel 14 or 14a into engagement with casing 31. For ease of control of the operation of wheels 14 and 14a, a push-button switch 34 is mounted on the back side of the member 5 a short distance above handle 33; this switch being, of course, interposed in the circuit of motor 1. The lateral divergence of suspension units 6 and 6a centralizes the applier relative to the horn 32 while allowing of lateral deflection of the applier by operator pressure when the device is being used.

As a safety feature in the event of spring breakage in either suspension unit 6 or 6a, and to avoid bouncing when the hold-down pressure handle 33 is released, each suspension unit is constructed as follows:

The suspension tension spring 35 is rigidly connected at its ends, as by welding W, to horizontal axis rings 36 and 36a, the upper one of which is connected to a snap-hook 8, while the lower one is suitably connected to plate 3.

A metal tube 37 is secured to upper ring 36 and depends inside spring 35 some distance; while a rod 38 is rigid with lower ring 36a and extends into tube 37 some distance. On its upper end, rod 38 carries a head 39 while the lower end of tube 37 is provided with an inwardly projecting flange 40 forming a stop shoulder engageable with the head to halt separation of rings 36 and 36a after movement thereof a short distance greater than that necessary to bring wheels 14 or 14a into engagement with the casing 31. In the event of spring breakage, therefore, the motor cannot drop very far, and possible harm to the operator and damage to the equipment is avoided.

In order to snub the rebound contraction of the spring, a collar 41 is mounted on rod 38 below stop flange 40.

As will be evident from the foregoing description, all working parts except the suspension units (which are well above the operating zone) are completely enclosed, making the device very safe to use. Also, since the exterior metal parts—the tube 5, gear housing 11, and metal backing plates 22 and 24—are polished and of non-corrosive nature, the device is extremely easy to clean and maintain in a proper sanitary condition.

The length of tube 5 is sufficient to place the motor 1, and of course the spring suspension units 6 and 6a, well out of the way above the operator's head.

The casing applier, as a whole, is sufficiently light to be readily portable, connection or disconnection of the two snap hooks 8 and 8a, and plugging in or out of extension cable 2, being all that is required to mount or demount the applier.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In a casing applier, a horizontal driven shaft, a ring on the shaft intermediate its ends forming a stop, an inner backing plate having a hub slidable on the shaft and abutting the ring, a pair of opposed casing-engaging friction discs on the shaft outwardly of said plate, a spacer disc between said pair of discs and an outer backing plate having a hub threaded on the outer end portion of the shaft; the discs having central openings through which the last named hub projects in close fitting relation.

2. A device as in claim 1 in which the spacer disc is of resilient compressible material whereby to hold the threads of the shaft and hub in clamped engagement when the spacer disc is put under compression by the advance of the outer plate against the adjacent friction disc.

MAYNARD J. G. TIPPER.

REFERENCES CITED

The following references are of record in the file of this patent:

UNITED STATES PATENTS

| Number | Name | Date |
|---|---|---|
| 577,586 | Schonland | Feb. 23, 1897 |
| 923,953 | Davis | June 8, 1909 |
| 1,146,730 | Osgood et al. | July 13, 1915 |
| 1,282,141 | Thompson | Oct. 22, 1918 |
| 1,303,011 | Aurand | May 6, 1919 |
| 1,492,697 | Neuberth | May 6, 1924 |
| 2,231,954 | Scherubel | Feb. 18, 1941 |